United States Patent Office 2,798,768
Patented July 9, 1957

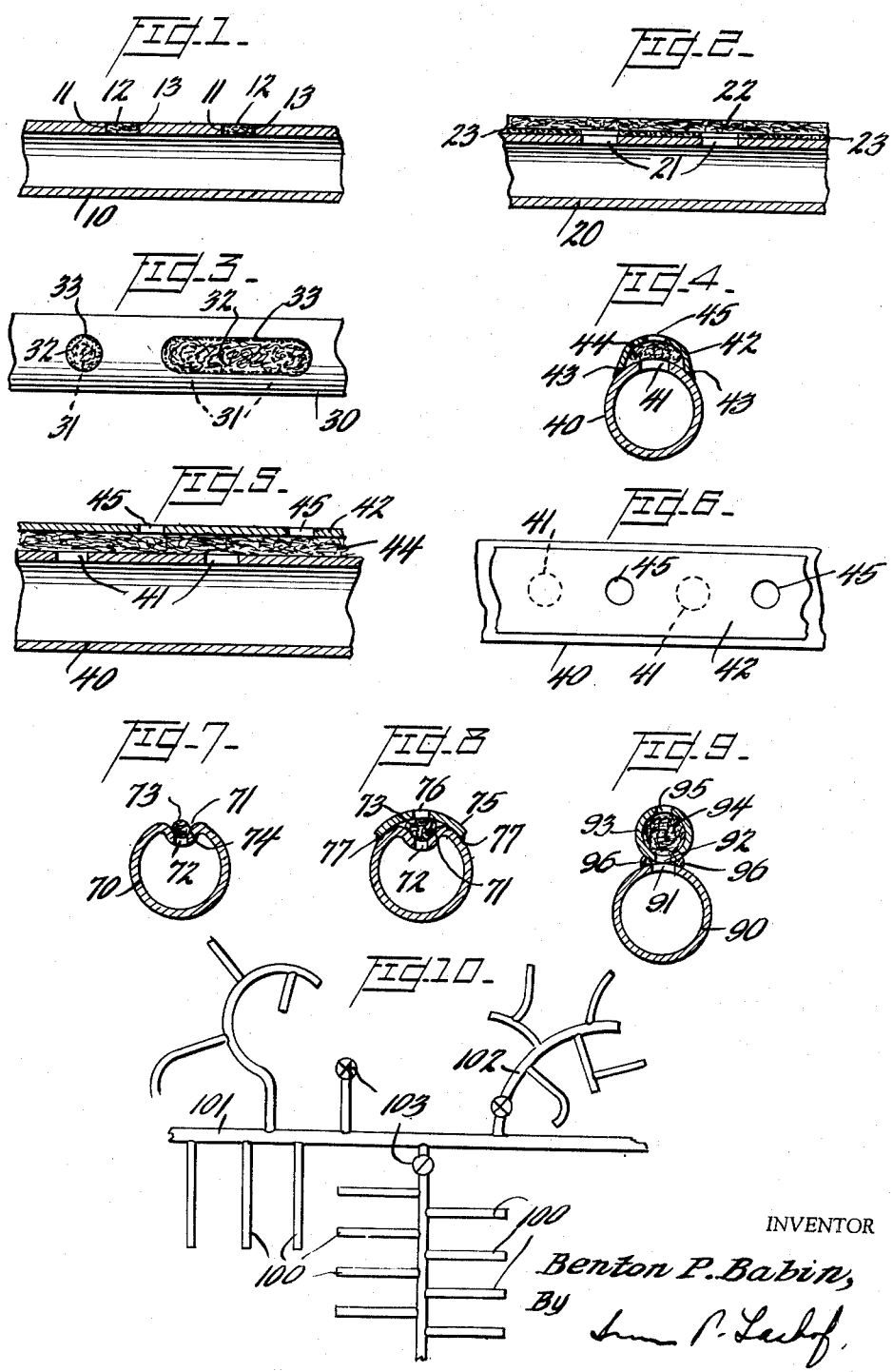

2,798,768

SOIL MOISTENING APPARATUS

Benton Paul Babin, New Orleans, La.

Application December 23, 1955, Serial No. 555,110

1 Claim. (Cl. 299—104)

The present invention relates to apparatus for the distribution of liquids for the purpose of moistening soil and includes the incorporation of substances into the soil by means of the liquid which is distributed. More particularly, the present invention is directed to novel pipe constructions through which liquids may be pumped or allowed to flow and capable of permitting the free passage of liquid therethrough while at the same time allowing small quantities of liquid to be discharged along the length of the pipe.

In the moistening of soil, the pipe constructions of the invention may be positioned above the ground, on the ground or beneath the ground, the latter being preferred since loss of liquid through evaporation and run-off is reduced and the liquid is uniformly distributed and supplied where it is immediately available for use by the roots of growing plants.

The importance of irrigation and the necessity therefor are well known, irrigation being probably one of the oldest occupations of civilized man. In the past, systems of open canals and laterals have been used to convey water from a source thereof for the purpose of moistening soil in an area under cultivation. While this system is in common use today, its disadvantages are well known. At the present time, water is frequently conveyed by systems of pipes in which sprinkling devices are installed at spaced points along the pipes and water, which may contain a soil enriching substance incorporated therein, is pumped through the pipes and discharged through the sprinklers into the air. This method is also attended by disadvantage, there being inherent in the system a substantial loss of water through evaporation and run-off.

It is also known to pump or allow water to flow into a porous receptacle placed in the ground so that the soil surrounding the receptacle might be moistened by seepage of liquid through the porous walls of the receptacle. This system possesses great advantage in that evaporation and run-off are substantially eliminated. However, this expedient is not, at present, well adapted for the distribution of liquids over substantial areas.

The present invention has as an object the provision of novel pipe constructions adapted for the moistening of soil by seepage of liquid while enabling the liquids to be rapidly conveyed for great distances through the pipe and permitting substantial areas under cultivation to be supplied with liquid. More particularly, the present invention contemplates the provision of pipe constructions which are low in cost, adapted for mass production and ease of distribution, installation and operation, and low in maintenance to thereby enable the efficient and effective utilization and conservation of available water and the simplification of soil enrichment as by the incorporation therein of fertilizers. Also, the present invention includes the provision of pipe constructions which are adapted for installation above, on, or in any terrain and are suitable for area as well as spot irrigation.

Other and further objects of the invention will become apparent from the description which follows taken in conjunction with the accompanying drawings in which:

Fig. 1 is a side elevation, in section, of a pipe constructed in accordance with the invention;

Fig. 2 is a side elevation, in section, of a modified pipe constructed in accordance with the invention in which the porous member is continuous and is positioned externally of the pipe;

Fig. 3 is a plan view of another embodiment of the invention in which the external porous member is discontinuous;

Fig. 4 is a cross-section of a pipe constructed in accordance with the invention employing a separate reservoir for liquid;

Fig. 5 is a side elevation, in section, of the pipe shown in Fig. 4;

Fig. 6 is a plan view of the pipe shown in Fig. 4;

Fig. 7 is a cross-section of a further embodiment employing a grooved pipe;

Fig. 8 is a cross-section of a pipe similar to that shown in Fig. 7 and including a separate reservoir for liquid;

Fig. 9 is a cross-section of an embodiment in accordance with the invention employing superposed connected pipes; and Fig. 10 is a diagrammatic plan view illustrating the manner in which pipes constructed in accordance with the invention are employed in the moistening of soil.

In accordance with the present invention, an elongated liquid-conducting tubular member, which may be termed a tube or pipe, is constructed with imperforate walls of suitable material and apertures are cut or otherwise formed at a plurality of spaced points along the length thereof. These apertures are entirely obstructed by a porous instrumentality to the end that liquids may flow or be pumped through the tube or pipe for great distances while permitting the seepage of liquid through the porous instrumentality. The porous instrumentality also functions to prevent ingress of foreign matter into the tube or pipe.

Thus, liquids may be conveyed great distances while permitting the slow discharge of liquid along the length of the conducting conduit. It will be understood that the range of the system is influenced by the size of pipe employed, the pressure imposed on the liquid, the size, character and number of apertures and the character and positioning of the porous instrumentalities as well as by other factors. By appropriate selection of pipe and pressure, the rate of moistening for a given area or spot can be very accurately controlled to the end that the most efficient and effective utilization of available water is achieved.

Further, in accordance with the invention, it is desired that the tube or pipe be mass produced in long lengths and yet be adapted for ease of distribution and installation. These ends are achieved when the tube or pipe is continuously produced in flexible form so that it may be conveniently stored and shipped in long lengths in the form of a coil and easily uncoiled for installation without danger of breakage due to handling. It will be appreciated that rigid structures known to the prior art cannot be handled as a coil and are difficult to install on rough terrain where the conduit is most conveniently positioned in a sinuous manner.

Referring to Fig. 1 which illustrates a simplified form of the invention, a pipe 10 is provided with a plurality of apertures 11 which are obstructed by porous inserts 12 which may be held in place in any suitable manner as by cementing, as shown at 13. The pipe 10 is preferably constituted by a very long tube of flexible synthetic plastic material which is conveniently formed by a continuous extrusion procedure and stored in the form of a coil.

Uniformity of distribution is also important and to prevent the stopping up of individual apertures from unduly disturbing the desired uniformity, the porous member may be made to cover a plurality of apertures as shown in Fig. 2 where the porous member is constituted by a fibrous glass strip of substantial thickness with the fibers of the strip being preferably held in position by adhesive or by weaving. More specifically, the pipe 20 is provided with aligned apertures 21 and a strip or cord of fibrous glass 22 is superposed over the apertures 21 and retained by suitable means, an adhesive connection being indicated at 23. The pipe 20 is preferably flexible in the same manner as the pipe 10, previously discussed. It will also be noted that the porous strip 22 is also flexible. Thus, the pipe can be continuously formed and the strip 22 continuously adhered thereto to form a composite product which is flexible and can be coiled.

A further embodiment in which the porous member overlies the apertures is shown in Fig. 3 where the pipe 30 is provided with apertures 31 which are covered by discrete sections of porous material 32 which may extend to surround one or more of the apertures, as illustrated, and which are adhesively secured at their margins at 33.

To further insure against the blocking of apertures and the possible partial obstruction of the pipe, a discharge reservoir or compartment may be provided separate from the portion of pipe through which liquids are intended to flow, the reservoir being formed by a cover which also functions to retain the porous member in position. In this regard, Figs. 4, 5 and 6 show an embodiment in which a continuous cover of generally U-shaped cross-section is employed. More particularly, the pipe 40 is provided with aligned apertures 41 and a cover 42 is secured, desirably by an adhesive bond 43, to the pipe 40, it being understood that a continuous porous member 44 is previously inserted in the cover 42 or is simultaneously applied therewith. The cover 42 is provided with apertures 45 which are preferably positioned intermediate the apertures 41 of the pipe 40 as can be seen in Figs. 5 and 6. Desirably, the porous member is constituted by a continuous cord of fibrous glass as can best be seen in Fig. 4. If desired, the porous member 44 can first be adhesively secured in proper position on the pipe 40 and the cover 42 applied subsequently.

Another desirable construction is shown in Fig. 7 where the pipe 70 is formed with a groove 71 and apertures 72 are provided within the grooved portion 71 and preferably at the bottom of the groove, as shown. A continuous porous member 73 can then be inserted within the groove where friction aids in its retention. An adhesive bond may also be included, a spot bond being illustrated at 74.

Fig. 8 shows a construction identical with that shown in Fig. 7 with the exception that the porous member 73 is retained in position by a perforated strip 75 having apertures 76 therein, the adhesive bond 74 having been eliminated and replaced by an adhesive bond 77 between the pipe 70 and the strip 75. It will be appreciated that the space between the pipe 70 and the strip 75, e. g. the space defined by the groove 71 serves as a reservoir for liquid.

Another construction including a reservoir is shown in Fig. 9 where liquid flows through the unobstructed pipe 90 which is provided with aligned apertures 91 which mate with apertures 92 in a tube 93 which is filled with a porous material 94 and provided with apertures 95 for the egress of liquid. The pipe 90 and tube 93 are secured together in any fashion, adhesive 96 being illustrated.

The various pipes as represented by those previously described are combined by the use of suitable headers and interconnections into a system capable of supplying an area undergoing cultivation with water or water containing various agents dissolved therein. As will be evident, many different systems or piping arrangements can be used and these form no part of the invention. In Fig. 10, 100 indicates pipes in accordance with the invention, 101 indicates a main supply conduit of conventional construction, 102 indicates a header of conventional construction and 103 represents valves for adjusting the rate of flow of liquid.

The pipe and cover shown in the drawings may be made of any suitable material, if being preferred to employ synthetic plastic materials which may or may not be reinforced by the inclusion therewithin of various fillers or fibrous strengthening elements. The use of thermoplastic materials such as vinyl resins is especially preferred since in such instance the adhesive bonds which have been illustrated can be constituted by a seal effected by the application of heat and pressure in known manner. Desirably, the plastic pipes may be formed by continuous extrusion and the apertures formed and porous members and covers applied continuously. As will be evident, the constructions shown are particularly adapted for mass production in continuous manner.

I claim:

In an apparatus for moistening soil, an elongated liquid conducting tubular member provided with a plurality of aligned apertures spaced along the length thereof and extending entirely through a wall of said tubular member, a continuous cover overlying said apertures to form a reservoir for liquid between said tubular member and said cover, the apertures in said liquid conducting tubular member being entirely obstructed by porous material which is positioned in said reservoir, said porous material permitting seepage of liquid therethrough while preventing ingress of foreign matter, and said cover being provided with apertures to permit egress of liquid therefrom, the perforation in said cover being longitudinally staggered with respect to the perforations in said tubular member, said cover being substantially U-shaped in cross-section and said cover having its edges contacting the outer surface of the tubular member and secured thereto.

References Cited in the file of this patent

UNITED STATES PATENTS

| | | |
|---|---|---|
| 901,582 | Austin | Oct. 20, 1908 |
| 953,080 | Wiggins | Mar. 29, 1910 |
| 1,604,189 | Nelson | Oct. 26, 1926 |
| 2,052,020 | Black | Aug. 25, 1936 |
| 2,084,005 | Richards | June 15, 1937 |
| 2,653,449 | Stauch | Sept. 29, 1953 |
| 2,730,404 | Meisinger et al. | Jan. 10, 1956 |